United States Patent
Lin

(10) Patent No.: US 9,801,195 B2
(45) Date of Patent: Oct. 24, 2017

(54) MOBILE DEVICE AND METHOD FOR MANAGING BACKGROUND DATA TRANSMISSION THEREOF

(71) Applicant: HTC Corporation, Taoyuan County (TW)

(72) Inventor: Chen-Hua Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 925 days.

(21) Appl. No.: 13/861,400

(22) Filed: Apr. 12, 2013

(65) Prior Publication Data

US 2014/0307636 A1    Oct. 16, 2014

(51) Int. Cl.
*H04W 72/12*    (2009.01)

(52) U.S. Cl.
CPC .................. *H04W 72/12* (2013.01)

(58) Field of Classification Search
CPC .............................. H04W 72/12; Y02B 60/50
USPC ......................................................... 370/329
See application file for complete search history.

(56) References Cited

U.S. PATENT DOCUMENTS

| | | | |
|---|---|---|---|
| 8,280,400 B1 | 10/2012 | Morley et al. | |
| 2005/0195830 A1* | 9/2005 | Chitrapu | H04L 67/04 370/395.21 |
| 2007/0230420 A1* | 10/2007 | Bumiller | H04W 48/18 370/338 |

FOREIGN PATENT DOCUMENTS

| | | |
|---|---|---|
| EP | 1787213 | 5/2007 |
| TW | 201216751 | 4/2012 |
| TW | 201310941 | 3/2013 |

OTHER PUBLICATIONS

"Office Action of Taiwan Counterpart Application", dated Oct. 30, 2014, p. 1-p. 4, in which the listed references were cited.

* cited by examiner

*Primary Examiner* — Andrew Lai
*Assistant Examiner* — Leon Andrews
(74) *Attorney, Agent, or Firm* — JCIPRNET

(57) ABSTRACT

A mobile device and a method for managing background data transmission of the mobile device are provided. The method includes the following steps: recording a plurality of entries, obtaining a time limit for a background data transmission of the mobile device, and scheduling the background data transmission according to the time limit and the entries. Each of the entries includes a location of the mobile device when the entry is recorded, a time of the mobile device when the entry is recorded, and a network information of the mobile device when the entry is recorded. The time limit indicates a time point before which the background data transmission should be finished.

12 Claims, 5 Drawing Sheets

MOBILE DEVICE AND METHOD FOR MANAGING BACKGROUND DATA TRANSMISSION THEREOF

BACKGROUND OF THE INVENTION

Field of the Invention

The present invention relates to data transmission of a mobile device. More particularly, the present invention relates to a mobile device and a method for managing background data transmission of the mobile device.

Description of the Related Art

Mobile devices with network capabilities, such as smart phones and tablet computers, are already very prevalent. Sometimes a user needs to upload or download a large amount of data with his/her mobile device, such as uploading a batch of pictures to his/her blog or downloading a video file from his/her friend's blog. Such time-consuming and system resources consuming data transmissions are usually performed in the background of the mobile device.

A mobile device is constantly carried around by its user. Therefore, the network transmission speed changes with location and time. For example, the network transmission speed can become slower when the mobile device is far from the base station, when the network bandwidth is shared by many people or when the mobile device enters an elevator.

A conventional mobile device performs the background data transmission immediately and unceasingly, regardless of the current location and the current time, until it finishes the background data transmission. However, such immediate and unceasing data transmission is a waste of power and also causes impact of user feeling due to the system resources occupied when the network transmission speed is very slow.

SUMMARY OF THE INVENTION

Accordingly, the present invention is directed to a mobile device and a method for managing background data transmission of the mobile device. The present invention can schedule background data transmissions of mobile devices according to historical patterns of network bandwidths and/or network transmission speeds to perform the upload or download at optimal locations and times to improve the efficiency of the background data transmissions and save power and system sources for the mobile devices.

According to an embodiment of the present invention, a method for managing background data transmission is provided, which includes the following steps: recording a plurality of entries, obtaining a time limit for a background data transmission of a mobile device, and scheduling the background data transmission according to the time limit and the entries. Each of the entries includes a location of the mobile device when the entry is recorded, a time of the mobile device when the entry is recorded, and a network information of the mobile device when the entry is recorded. The time limit indicates a time point before which the background data transmission should be finished.

According to another embodiment of the present invention, a mobile device is provided. The mobile device includes a wireless module, a storage device, and a processor coupled to the wireless module and the storage device. The processor records the aforementioned entries in the storage device, obtains a time limit for a background data transmission of the mobile device, and schedules the background data transmission according to the time limit and the entries. The time limit indicates a time point before which the background data transmission should be finished.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
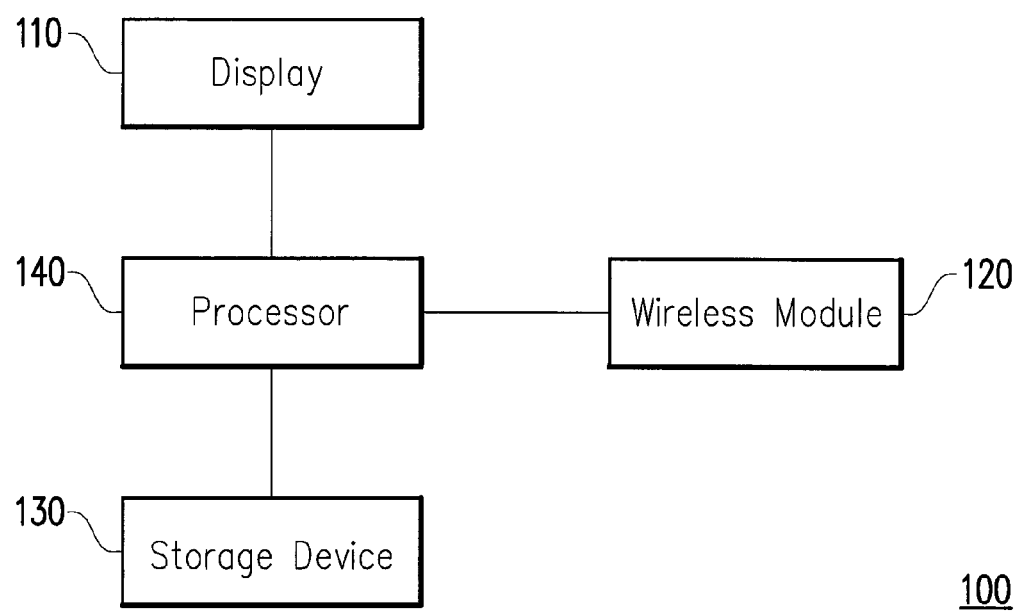
FIG. 1 is a schematic diagram showing a mobile device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a mobile device 100 according to an embodiment of the present invention. The mobile device 100 may be a smart phone, a personal digital assistant (PDA), a tablet computer, or a notebook computer. The mobile device 100 may access one or more communication networks. Each communication network may be based on different wireless technology, such as, but not limited to, Wireless Fidelity (Wi-Fi), Worldwide Interoperability for Microwave Access (WiMAX), Wideband Code Division Multiple Access (WCDMA), Long Term Evolution (LTE) or General Packet Radio Service (GPRS).

The mobile device 100 includes a display 110, a hardware wireless module 120, a storage device 130, and a processor 140 coupled to the display 110, the wireless module 120, and the storage device 130. The processor 140 may execute the following methods shown in FIG. 2, FIG. 3, FIG. 4 and FIG. 5. The wireless module 120 is the communication interface between the mobile device 100 and the aforementioned communication networks. The storage device 130 may be a memory or a hard disk, such as a synchronous dynamic random-access memory (SDRAM), a secure digital card (SD card) or a NAND flash memory.

Figure 2:
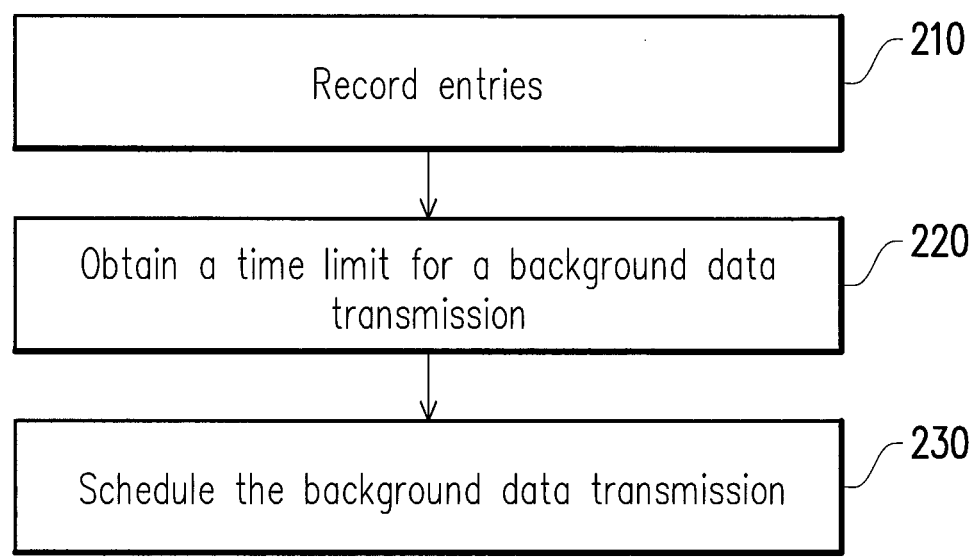
FIG. 2, FIG. 3, FIG. 4 and FIG. 5 are flow charts showing methods for managing background data transmission according to various embodiments of the present invention.

FIG. 2 is a flow chart showing a method for managing background data transmission according to an embodiment of the present invention. In this embodiment, the processor 140 may execute multiple applications. The display 110 displays one or more of the applications. The application(s) currently displayed by the display 110 is known as the foreground application(s), while the other applications are known as the background applications. The user of the mobile device 100 may switch any one of the applications to be a foreground application or a background application. In general, data transmission of the foreground application has a higher priority than that of data transmission of a background application.

In this embodiment, a foreground data transmission is a data transmission performed by a foreground application, while a background data transmission is a data transmission performed by a background application instead of a foreground application. A data transmission may be data upload or data download performed by the wireless module 120, such as uploading picture files to a remote server, downloading attachments of emails or video files from a remote server, or downloading background synchronization data from an access point (AP) or a base station of a communication network.

In step 210, the processor 140 records a plurality of entries in the storage device 130. The processor 140 may record the entries periodically. Each entry may include the location of the mobile device 100 when the entry is recorded, the time of the mobile device 100 when the entry is recorded, and the network information of the mobile device 100 when the entry is recorded. The processor 140 may determine the location of the mobile device 100 according to one or more signals received by the wireless module 120 from at least one of a Global Positioning System (GPS) system, one or more APs (e.g. Wi-Fi) and one or more base stations (e.g. WiMAX, WCDMA, LTE, GPRS) of the one or more communication networks. Since all these location determination technologies are well known and pervasively used, we will not describe the detail in here. The time of the mobile device 100 may be a Greenwich Mean Time (GMT), an operating system time or a Real Time Clock (RTC) time. The network information may include at least one of the following: network identification (ID), network type, transmission bandwidth, and transmission speed of the aforementioned one or more communication networks accessible to the mobile device 100, and the strengths of the signals received by the wireless module 120 from APs or base stations of the aforementioned one or more communication networks. The aforementioned network ID may be the service set identification (SSID) of Wi-Fi AP. The aforementioned network type may be Wi-Fi, WiMAX, WCDMA, LTE, or GPRS. The aforementioned transmission bandwidth may be upload bandwidth and/or download bandwidth. The aforementioned transmission speed may be upload speed and/or download speed. The processor 140 may use the strengths of the received signals, the network ID or the network type to identify the locations recorded in the entries. For example, sometimes the short range wireless connection ID such as Wi-Fi SSID is enough to identify the location. Based on the recorded entries, the processor 140 knows the historical pattern of network information in different locations and times. In other words, the recorded entries indicate the network information associated with the moving trace of the mobile device 100 while user travels from one location to another location. An embodiment of the present invention to establish these entries is to let the processor 140 periodically receive and store the aforementioned network information while the mobile device 100 travels around.

In step 220, the processor 140 obtains a time limit for a background data transmission of the mobile device 100. The time limit may be specified by the user, operation system, or application of the mobile device 100. The specified time limit indicates a time point before which the background data transmission should be finished which also means that the background data transmission is expected to be finished no later than this time limit. In step 230, the processor 140 schedules the background data transmission according to the time limit and the entries. The method in this embodiment assumes that the future pattern of network information of the mobile device 100 will be the same as, opposite to, or similar to the historical pattern of network information of the mobile device 100 while the mobile device 100 moves along the same, opposite or similar trace in the future. Therefore, the background data transmission can be scheduled according to the time limit and the entries.

The processor 140 may schedule the background data transmission according to the locations and the times of the entries with the largest transmission bandwidths and/or the highest transmission speeds so that the background data transmission can be finished in the time limit and consume less power and less system resource. For example, the following table 1 shows the location field, the network type field, the time field and the download speed field of some entries recorded while an user daily commutes from home (Location A) to office (Location E) according to an embodiment of the present invention. The user daily commutes in opposite direction from office (Location E starting at around 5:00 PM) back to home (Location A arriving at around 5:50 PM) after the office duty.

| Location | Network Type | Time | Download Speed (kilobytes per second) |
| --- | --- | --- | --- |
| Location A | WCDMA | 10:00AM-10:10AM | 100 |
| Location B | GPRS | 10:10AM-10:20AM | 60 |
| Location C | Wi-Fi | 10:20AM-10:30AM | 300 |
| Location D | WiMAX | 10:30AM-10:40AM | 400 |
| Location E | LTE | 10:40AM-10:50AM | 200 |

The processor 140 may schedule the background data transmission for the time of the entry with the highest transmission speed. When this is not enough to finish the background data transmission in the time limit, the processor 140 may further schedule the background data transmission for the time of the entry with the second highest transmission speed, and so on.

For example, when the user wants to download a video file with a size of 200 megabytes (MB) at office time, for example at 2:00 PM and the time limit which is set by user or system default value is that the download must be finished before 6:00 PM so that the user could enjoy the video at home after office duty, the processor 140 may schedule the background data transmission for 5:10 PM-5:20 PM at location D while the user moves back home from office later because the download speed of the period 5:10 PM-5:20 PM is the highest and the period 5:10 PM-5:20 PM alone can finish the download. For another example, when the user wants to download another video file with a size of 400 MB and the time limit is that the download must be finished before 6:00 PM, the processor 140 may schedule the background data transmission beginning from 5:10 PM-5:30 PM at location D and location C because the period 5:10 PM-5:20 PM at location D alone cannot finish the download and the download speed at location C is the second highest.

The priority of a foreground data transmission of the mobile device 100 is usually higher than that of a background data transmission of the mobile device 100. When a foreground data transmission of the mobile device 100 begins during a background data transmission of the mobile device 100, the processor 140 may allocate a part of the network bandwidth used by the background data transmission dedicatedly to the foreground data transmission to ensure the quality of service (QoS) of the foreground data transmission.

The aforementioned allocation of network bandwidth to the foreground data transmission may delay the progress of the background data transmission. Therefore, the processor 140 may determine a transmission buffer time according to a network usage history of the foreground data transmission of the mobile device 100. In addition, the processor 140 may schedule the background data transmission for the locations and the times of the entries with the largest transmission bandwidths and/or the highest transmission speeds so that the background data transmission can be finished in a length of time equal to or less than the time limit minus the transmission buffer time. The network usage history may include the time of the foreground data transmission and the amount of data of the foreground data transmission. The network usage history may only count the foreground data transmissions whose amount of data is more than a preset size threshold.

For example, when the time of the foreground data transmission always overlaps with the scheduled time of the background data transmission according to the network usage history, the processor 140 may set the transmission buffer time to be the length of time necessary to finish the foreground data transmission. When the time of the foreground data transmission does not always overlap with the scheduled time of the background data transmission according to the network usage history, the processor 140 may set the transmission buffer time to be a percentage of the length of time necessary to finish the foreground data transmission. The aforementioned percentage may be determined according to the probability that the time of the foreground data transmission overlaps with the scheduled time of the background data transmission according to the network usage history.

Figure 3:
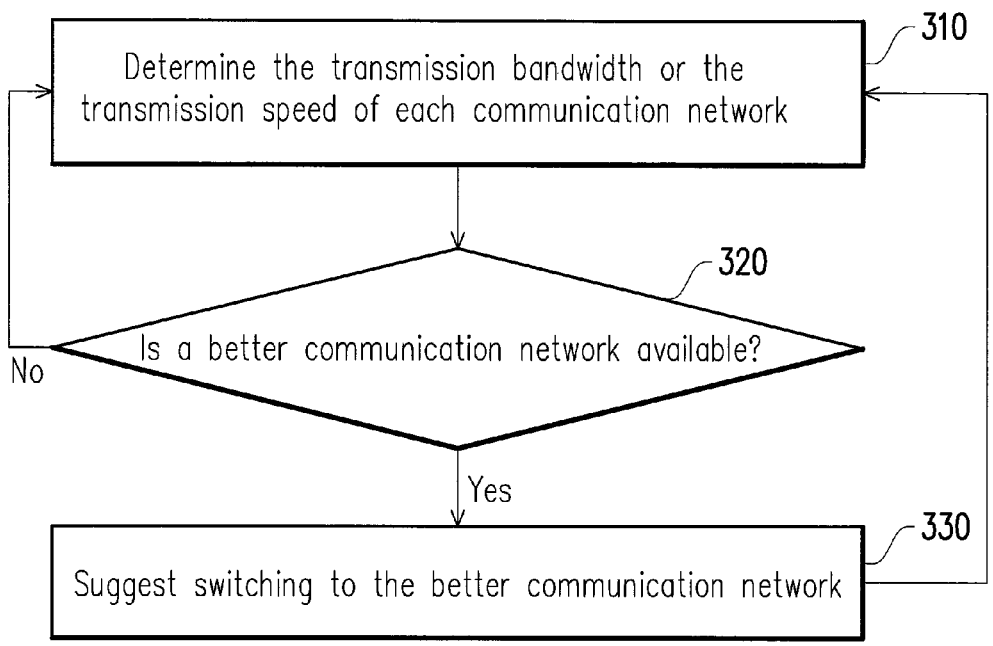

FIG. 3 is a flow chart showing a method for managing background data transmission according to another embodiment of the present invention. The flow in FIG. 3 is applicable to switch a foreground data transmission or a background data transmission to a better communication network. In step 310, the processor 140 determines the transmission bandwidth or the transmission speed of each of the aforementioned one or more communication networks. The mobile device 100 needs to perform background synchronization periodically with the APs and/or the base stations of the communication networks. Therefore, the mobile device 100 can know the transmission bandwidth and the transmission speed of each communication network.

In step 320, the processor 140 checks whether there is a better communication network available to any foreground data transmission or any background data transmission of the mobile device 100 or not. The better communication network means a communication network which is accessible to the mobile device 100 and whose transmission bandwidth or transmission speed is higher than the corresponding transmission bandwidth or transmission speed of the current communication network used by a foreground data transmission or a background data transmission. When there is no such better communication network, the flow returns to step 310. When there is a better communication network, the flow proceeds to step 330, wherein the processor 140 prompts to suggest the user to switch the foreground data transmission or the background data transmission to the better communication network. The user may decide whether to switch the current communication network or not, and then the flow returns to step 310. For example, when the mobile device 100 can access a Wi-Fi communication network and a 3G communication network, and the mobile device 100 currently uses the Wi-Fi communication network to perform a data transmission (foreground or background) and currently the 3G communication network provides faster transmission speed, the processor 140 may control the display 110 to display a notification to suggest the user to switch the data transmission to the 3G communication network.

The method shown in FIG. 2 assumes that the pattern of movement of the user of the mobile device 100 is the same every day or every period of time. Therefore, the background data transmission can be scheduled based on historical pattern of network information. On the other hand, the methods shown in FIG. 4 and FIG. 5 may be used to handle the situation that the user of the mobile device 100 deviates from the historical pattern.

Figure 4:
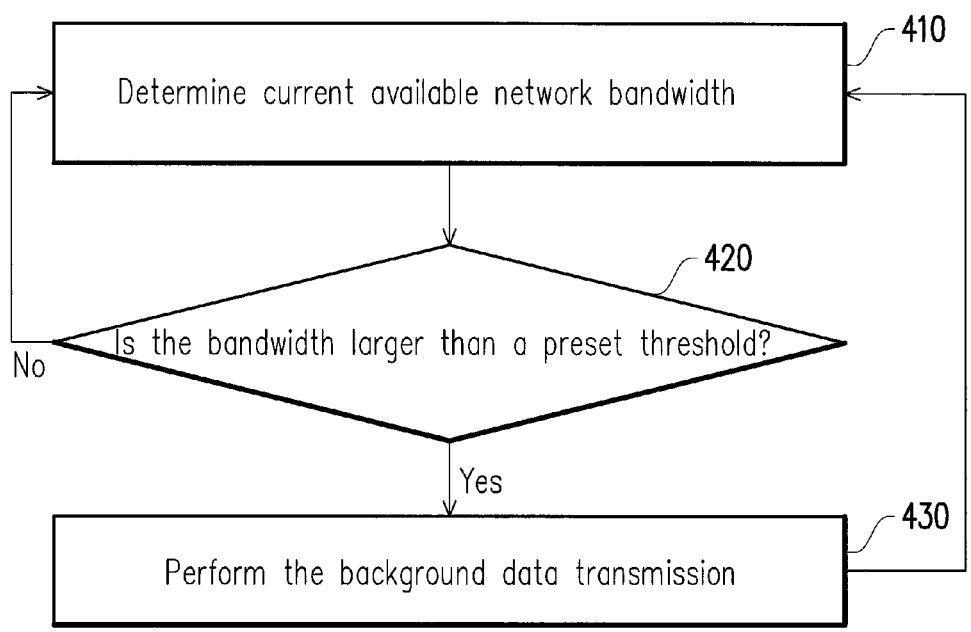

FIG. 4 is a flow chart showing a method for managing background data transmission according to another embodiment of the present invention. The processor 140 may execute the method in FIG. 4 when the current location and the current time of the mobile device 100 are consistent with none of the entries recorded in step 210. In this case, it might mean the mobile device 100 is out of its daily historical moving path. In step 410, the processor 140 determines the current network bandwidth available to the background data transmission. In step 420, the processor 140 checks whether or not the current network bandwidth available to the background data transmission is larger than a preset threshold. The flow returns to step 410 when the current network bandwidth available to the background data transmission is not larger than the preset threshold. When the current network bandwidth available to the background data transmission is larger than the preset threshold, the processor 140 performs the background data transmission in step 430, and then the flow returns to step 410.

Figure 5:
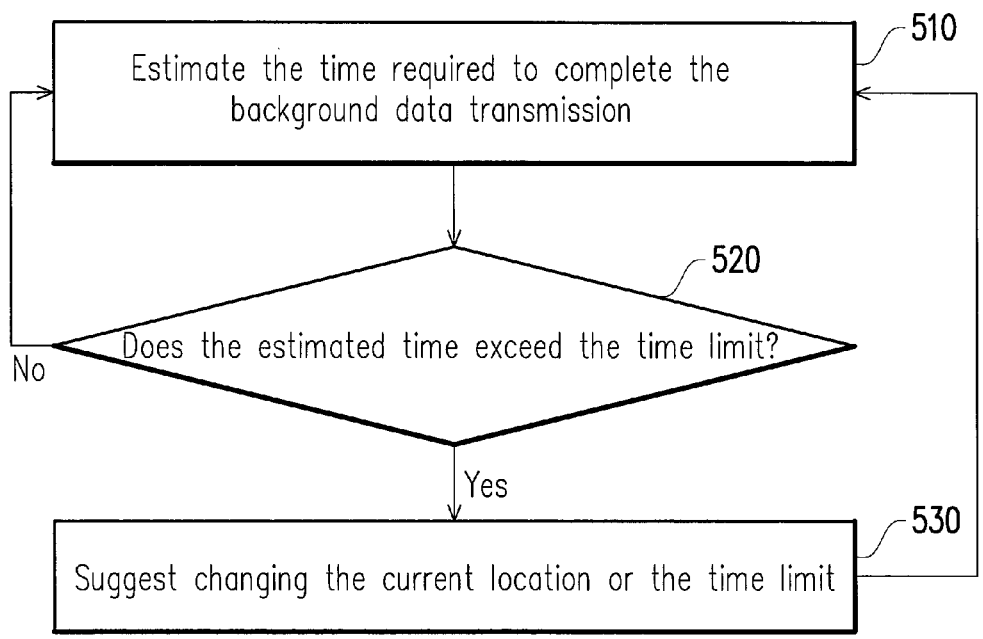

FIG. 5 is a flow chart showing a method for managing background data transmission according to another embodiment of the present invention. The flow in FIG. 5 is applicable when the user of the mobile device 100 deviates from his/her historical moving path or when the current network information is different from historical network information. In step 510, the processor 140 estimates the time required to complete the background data transmission according to data amount of the background data transmission and the current network bandwidth available to the background data transmission. In step 520, the processor 140 checks whether or not the estimated time exceeds the time limit. The flow returns to step 510 when the estimated time does not exceed the time limit. When the estimated time exceeds the time limit, in step 530, the processor 140 prompts to notify the user and suggest the user to change the current location or the time limit in order to finish the background data transmission in time. The processor 140 may further suggest better locations with broader transmission bandwidth or faster transmission speed based on the entries recorded in step 210. The user may decide to move to a better location, specify a more tolerant time limit, or do nothing. Next, the flow returns to step 510.

In summary, the present invention can record entries of past locations and times of a mobile device and the corresponding network information of the mobile device. When the mobile device needs to perform background data transmission, the present invention can use the recorded entries to choose the best location and timing for the background data transmission. This optimal scheduling can shorten the background transmission time and reduce the consumption of power and system resources of the mobile device. The present invention can guarantee the QoS of the foreground data transmission by reserving dedicated bandwidth for the foreground data transmission. In addition, the present invention can help the user of the mobile device to choose the communication network with the best bandwidth or transmission speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing background data transmission, comprising:
   recording a plurality of entries, wherein each of the entries comprises a location of a mobile device when the entry is recorded, a time of the mobile device when the entry is recorded, and a network information of the mobile device when the entry is recorded;
   obtaining a time limit for a background data transmission of the mobile device, wherein the time limit indicates a time point before which the background data transmission should be finished;
   determining a foreground data transmission time according to a network usage history recording time and amount of data corresponding a foreground data transmission overlapped with the background data transmission; and
   scheduling the background data transmission according to the time limit, the foreground data transmission time, and at least one entry among the recorded entries at the time and the location recorded with the network information having highest transmission speed, so that the background data transmission is completed in a length of time equal to or less than the time limit minus the foreground data transmission time.

2. The method of claim 1, further comprising:
   determining the location of the mobile device according to a signal received by the mobile device from at least one of a Global Positioning System (GPS) system, one or more access points and one or more base stations of one or more communication networks.

3. The method of claim 1, wherein the network information comprises at least one of network identification (ID), network type, transmission bandwidth and transmission speed of one or more communication networks accessible to the mobile device, and strength of a signal received by the mobile device from an access point and strength of a signal received by the mobile device from a base station of the one or more communication networks.

4. The method of claim 3, wherein the step of scheduling the background data transmission comprises:
   scheduling the background data transmission according to the locations and the times of the entries with the largest transmission bandwidths.

5. The method of claim 4, wherein the network usage history comprises a time of the foreground data transmission and amount of data of the foreground data transmission.

6. The method of claim 1, further comprising:
   allocating a part of network bandwidth used by the background data transmission dedicatedly to a foreground data transmission of the mobile device when the foreground data transmission begins during the background data transmission.

7. A mobile device, comprising:
   a wireless module;
   a storage device; and
   a processor, coupled to the wireless module and the storage device, recording a plurality of entries in the storage device, obtaining a time limit for a background data transmission of the mobile device, determining a foreground data transmission time according to a network usage history recording time and amount of data corresponding to a foreground data transmission overlapped with the background data transmission, and scheduling the background data transmission according to the time limit, the foreground data transmission time, and at least one entry among the plurality of entries at a time and a location recorded with a network information having highest transmission speed, so that the background data transmission is completed in a length of time equal to or less than the time limit minus the foreground data transmission time, wherein each of the entries comprises the location of a mobile device when the entry is recorded, the time of the mobile device when the entry is recorded, and the network information of the mobile device when the entry is recorded, and wherein the time limit indicates a time point before which the background data transmission should be finished.

8. The mobile device of claim 7, wherein the processor determines the location of the mobile device according to a signal received by the wireless module from at least one of a Global Positioning System (GPS) system, one or more access points and one or more base stations of one or more communication networks.

9. The mobile device of claim 7, wherein the network information comprises at least one of network identification (ID), network type, transmission bandwidth and transmission speed of one or more communication networks accessible to the mobile device, and strength of a signal received by the wireless module from an access point and strength of a signal received by the wireless module from a base station of the one or more communication networks.

10. The mobile device of claim 9, further comprising:
    a display coupled to the processor, wherein the processor schedules the background data transmission according to the locations and the times of the entries with the largest transmission bandwidths, wherein the foreground data transmission is performed by a foreground application currently displayed by the display and the background data transmission is performed by a background application.

11. The mobile device of claim 10, wherein the network usage history comprises a time of the foreground data transmission and amount of data of the foreground data transmission.

12. The mobile device of claim 7, further comprising:
    a display coupled to the processor, wherein the processor allocates a part of network bandwidth used by the background data transmission dedicatedly to a foreground data transmission of the mobile device when the foreground data transmission begins during the background data transmission, wherein the foreground data transmission is performed by a foreground application currently displayed by the display and the background data transmission is performed by a background application.

* * * * *